(12) United States Patent
Gibbons

(10) Patent No.: US 7,797,628 B2
(45) Date of Patent: Sep. 14, 2010

(54) METHOD OF USING A DIRECTED GRAPH AND A SYSTEM FOR USE WITH THE METHOD

(75) Inventor: John K. Gibbons, Center Point, TX (US)

(73) Assignee: PlanView, Inc., Austin, TX (US)

( * ) Notice: Subject to any disclaimer, the term of this patent is extended or adjusted under 35 U.S.C. 154(b) by 542 days.

(21) Appl. No.: 11/363,105

(22) Filed: Feb. 27, 2006

(65) Prior Publication Data

US 2006/0259452 A1 Nov. 16, 2006

Related U.S. Application Data

(60) Provisional application No. 60/681,287, filed on May 16, 2005.

(51) Int. Cl.
*G06F 17/00* (2006.01)
(52) U.S. Cl. ..................................... 715/255
(58) Field of Classification Search .................. 715/255
See application file for complete search history.

(56) References Cited

U.S. PATENT DOCUMENTS

| | | | |
|---|---|---|---|
| 5,201,046 A * | 4/1993 | Goldberg et al. ............. | 707/100 |
| 5,450,535 A * | 9/1995 | North ........................... | 345/440 |
| 5,930,512 A * | 7/1999 | Boden et al. .................. | 717/102 |
| 6,415,297 B1 | 7/2002 | Leymann et al. | |
| 6,931,412 B2 * | 8/2005 | Uyttendaele et al. ......... | 707/101 |
| 6,968,340 B1 * | 11/2005 | Knowles ....................... | 707/102 |
| 7,016,910 B2 * | 3/2006 | Egilsson et al. .............. | 707/101 |
| 7,075,536 B1 | 7/2006 | Goldschmidt | |
| 7,233,950 B2 * | 6/2007 | Smith, III ..................... | 707/10 |
| 7,421,660 B2 | 9/2008 | Charnock et al. | |
| 2002/0095561 A1 * | 7/2002 | Butler ........................... | 712/1 |
| 2003/0028550 A1 | 2/2003 | Lee et al. | |
| 2003/0233372 A1 | 12/2003 | Warner et al. | |
| 2004/0078258 A1 * | 4/2004 | Schulz et al. ................. | 705/9 |

OTHER PUBLICATIONS

Lyons, "Cluster busting in anchored graph drawing" in Proceedings of the 1992 Conference of the Centre for Advanced Studies on Collaborative Research—vol. 2 (Toronto, Ontario, Canada, Nov. 9 - 12, 1992) IBM Press, p. 327-337.*
International Search Report and Written Opinion for PCT/US06/17877 dated Jul. 24, 2008, 11 pgs.
U.S. Appl. No. 11/363,106, Office Action mailed Oct. 6, 2008.
Lim et al., "An automated Approach for Retrieving Hierarchical Data from HTML Tables", copyright 1999 AC, CIKM',p.
Gonzales et al., "Generating SVG Graphs and Charts from Database Queries", presented at SVG Open 2003, Jul. 2003, p. 1-17.

* cited by examiner

*Primary Examiner*—Amelia Rutledge

(57) ABSTRACT

A directed graph can be used with a browser application. In one embodiment, the browser application can allow the editor to edit and view the edited directed graph without having to change between software applications. A monitor at a client computer can display the directed graph in a format similar to what an actor will see when executing actions requested by the directed graph. In another embodiment, a virtual node can be used to represent a reconnection point for child columns of a row element within a parent column. The virtual node can be used when adding an element immediately after the row element.

22 Claims, 12 Drawing Sheets

522

| Tuple | Type | Description | Name | Status | ... |
|---|---|---|---|---|---|
| ... | ... | ... | ... | ... | ... |
| ... | ... | ... | ... | ... | ... |
| ... | ... | ... | ... | ... | ... |
| 524 | Action | Score Project | Manager | (null) | |
| 824 | Row | Row Element | Automatic | (null) | |
| 902 | Virtual | Virtual Node | N/A | N/A | |
| 1424 | Action | Approve Project | VP | (null) | |

| Tuple | Type | Description | Name | Status | ... |
|---|---|---|---|---|---|
| . | . | . | . | . | ... |
| . | . | . | . | . | ... |
| . | . | . | . | . | ... |
| 524 | Action | Score Project | Manager | (null) | ... |

| Tuple | Type | Description | Name | Status | ... |
|---|---|---|---|---|---|
| . | . | . | . | . | ... |
| . | . | . | . | . | ... |
| . | . | . | . | . | ... |
| 524 | Action | Score Project | Manager | (null) | ... |
| 824 | Row | Row Element | Automatic | (null) | ... |

| Tuple | Type | Description | Name | Status | ... |
|---|---|---|---|---|---|
| . | . | . | . | . | ... |
| . | . | . | . | . | ... |
| . | . | . | . | . | ... |
| 524 | Action | Score Project | Manager | (null) | ... |
| 824 | Row | Row Element | Automatic | (null) | ... |
| 902 | Virtual | Virtual Node | N/A | N/A | ... |

824

| Tuple | Type | Description | Name | Status | ... |
|---|---|---|---|---|---|
| 922 | Column | Column Element | Automatic | (null) | ... |
| 942 | Column | Column Element | Automatic | (null) | ... |

| Tuple | Type | Description | Name | Status | ... |
|---|---|---|---|---|---|
| 724 | Action | IfA Test | Automatic | (null) | ... |
| 926 | Action | Create Signoff Sheet | Project Leader | (null) | ... |

| Tuple | Type | Description | Name | Status | ... |
|---|---|---|---|---|---|
| 944 | Action | IfNotA Test | Automatic | (null) | ... |
| 946 | Action | Enter Financial Value | Accountant | (null) | ... |
| 948 | Action | Create Backup Plan | Engineer | (null) | ... |

FIG. 13

| Tuple | Type | Description | Name | Status | ... |
|---|---|---|---|---|---|
| ... | ... | ... | ... | ... | ... |
| ... | ... | ... | ... | ... | ... |
| ... | ... | ... | ... | ... | ... |
| 524 | Action | Score Project | Manager | (null) | |
| 824 | Row | Row Element | Automatic | (null) | |
| 902 | Virtual | Virtual Node | N/A | N/A | |
| 1424 | Action | Approve Project | VP | (null) | |

METHOD OF USING A DIRECTED GRAPH AND A SYSTEM FOR USE WITH THE METHOD

RELATED APPLICATIONS

The present disclosure is related to and claims priority under 35 U.S.C. §119(e) to U.S. Patent Application No. 60/681,287 entitled "Method of Using a Directed Graph and a System For Use With the Method" by Gibbons et al. filed on May 16, 2005, which is assigned to the current assignee hereof and incorporated herein by reference in its entirety.

The present disclosure is related to U.S. patent application Ser. No. 11/363,106 entitled "Method of Generating a Display For a Directed Graph and a System For Use With the Method" by Gibbons et al. filed on Feb. 27, 2006, which is assigned to the current assignee hereof and incorporated herein by reference in its entirety.

FIELD OF THE DISCLOSURE

The disclosure relates in general to methods and systems, and more particularly, to a method of using a directed graph and a system for use with the method.

DESCRIPTION OF THE RELATED ART

Many commercially available software products can be used to edit or executing actions for a project workflow. Usually, one software application is used when editing the project workflow ("editing application"), and another software application is used to display the project workflow using a browser ("viewing application"). The different software applications can cause problems. Because different applications are used, the editor of the workflow may need to switch between the editing application when editing the workflow and the viewing application when confirming that an edit was proper. Also, the display of information using the different software applications can be significantly different. A display using the editing application may appear acceptable, while the display of the same content using the viewing application may appear distorted, not aesthetically pleasing (to humans), or otherwise be unacceptable, or vice versa.

A project workflow is an example of a directed graph. An organizational chart is an example of such an open-ended directed graph because parent nodes branch out to child nodes, however, the child nodes do not reconnect. A supervisor may be represented by a parent node, and his or her direct subordinates may be represented by the child nodes from that parent node. The parent-child relationships can be iterated until all levels of an organization are determined. Display information related to the organizational chart is not too difficult to generate. However, workflows are significantly more complicated because child nodes may need to be reconnected, which would not occur with a conventional organizational chart.

Thus, the inability to edit a directed graph and view the directed graph as a user of the graph would see it, or the complexity regarding reconnecting parallel branches from child nodes, may make the editing and using of workflows or other similar directed graphs more difficult, particularly in client-server networks where client computers with different operating systems and browsers are used.

BRIEF DESCRIPTION OF THE DRAWINGS

The present invention is illustrated by way of example and not limitation in the accompanying figures, in which the same reference number indicates similar elements in the different figures.

FIG. 11 includes a database table that includes column elements corresponding to the row element.

FIGS. 12 and 13 include database tables that include action elements corresponding to the column elements 922 and 942, respectively.

Figure 1:
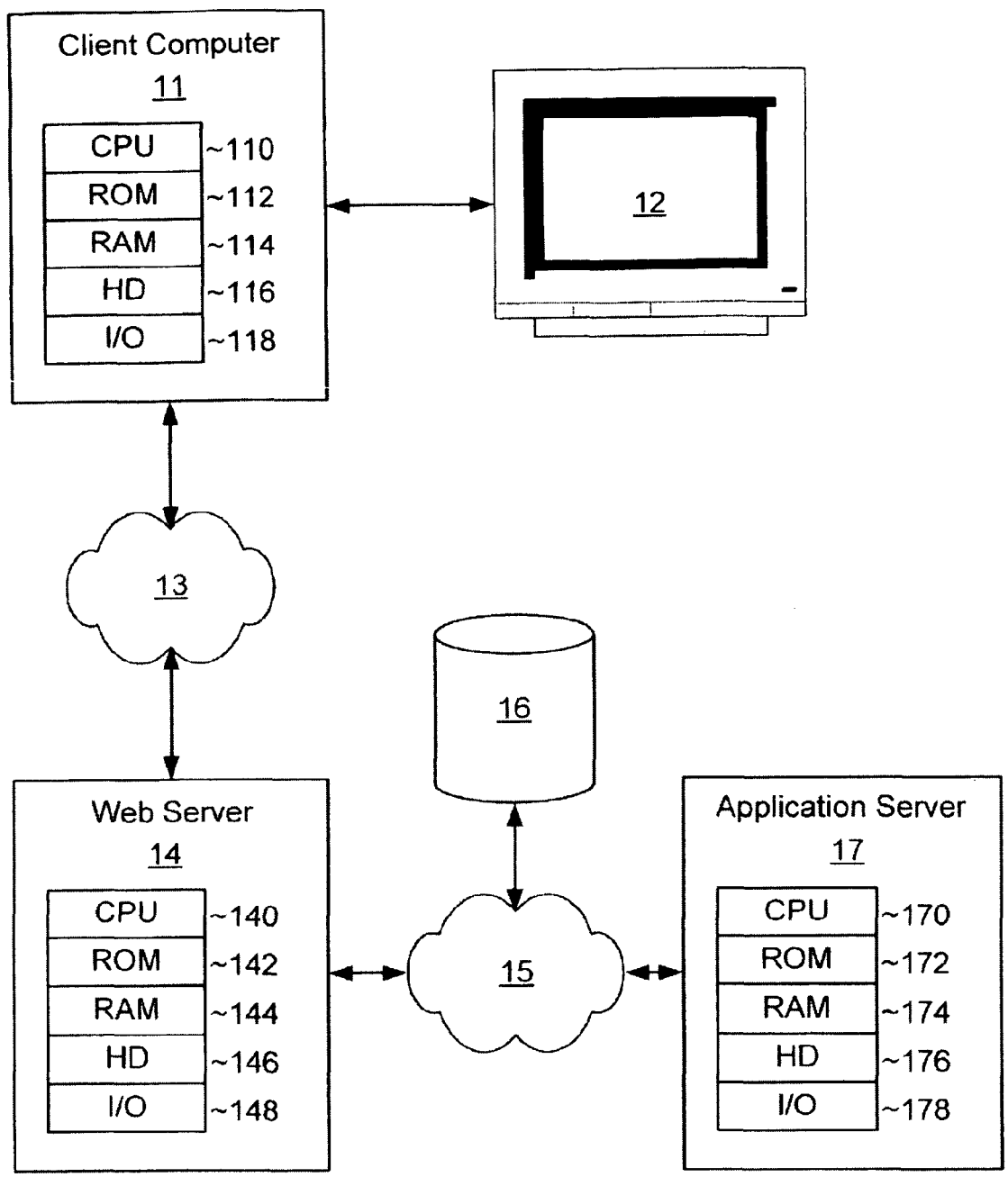
FIG. 1 includes an illustration of a system for using a directed graph.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

A directed graph can be edited and displayed using a browser application running on a client computer. In one embodiment, the browser application can allow the editor to edit and view the edited directed graph without having to change between software applications. A monitor at the client computer can display the directed graph in a format similar to what an actor (a user during execution of the workflow) will see when executing or reviewing actions requested by the directed graph. In another embodiment, a virtual node can be used to represent a reconnection point for child columns of a row element within a parent column.

A few terms are defined or clarified to aid in understanding the terms as used throughout this specification. The term "action element" is intended to mean an element that is associated with an action.

The term "actor" is intended to mean person using a directed graph during performance of a workflow. The actor may or may not be an editor, too.

The term "column" is intended to mean at least a portion of a workflow that includes one or more actions, or any combination of one or more actions and one or more row element that are designed to be performed serially. Note that the performance of one or more actions within a column may be conditional. A column element may be used within a data model to represent a column, and therefore, for the purposes of this specification, column and column element can be used interchangeably.

The term "directed graph" is intended to mean a chart, a graph or other visual representation in which the principal direction of flow within the chart, the graph or other representation is away from an initial point. In one embodiment, the chart, the graph, or other visual representation includes a terminal point, and the principal direction of flow is from the initial point to the terminal point.

The term "edit" and its variants are intended to mean to generate or change at least a portion of something. For example, an editor can generate a portion of a file or other data that is later changed by a different editor.

The term "element" is intended to mean an object that is associated with an action, a column, or a row (e.g., a set of parallel columns).

The term "row element" is intended to mean an element that is related to a plurality of parallel columns.

The phrase "from element X, a command Y is used" is intended to mean that through the medium of typed commands or a graphical user interface (GUI), a user points to, identifies, or references a particular element X, and then invokes a command Y to achieve the ends described in the context of the phrase. The identification of the element X may be a separate GUI action from invoking the command (as in clicking on the step to highlight it or give it focus), followed by a separate GUI action (such as clicking on a choice in a separate menu, button bar, or other GUI control) to invoke the command Y, or the two actions may be combined by having a menu or buttons within element X or otherwise made available directly by clicking on element X, or one or both parts may be accomplished by typing at a keyboard.

The phrase "element Y can include a reference to element X" is intended to mean that the data representation of element Y may include a direct or indirect pointer or key identifying or allowing the identification of element X. For example, elements X and Y are consecutive elements of column C. In one embodiment, element Y may include a direct pointer or key identifying or allowing the identification of element A. In another embodiment, each of elements X and Y may include a direct pointer or key identifying or allowing the identification of column C. Element Y is the immediate successor to element X because among the elements comprising column C, element Y has the lowest sequence number greater than that of X. Therefore, in this embodiment, element Y includes an indirect pointer or key identifying or allowing the identification of element X, via the direct pointer or key identifying or allowing the identification of column C and the sequence numbering of column C.

The phrase "X is displayed over Y" is intended to mean that through the use of designating X as being in the foreground compared to Y, Y as being in the background compared to X, or a combination thereof, when displayed at a monitor, X has the appearance as being over Y.

The phrase "application X instructs application Y to perform an action" is intended to mean that hardware, firmware, software, or any combination thereof executing code from application X transmits an instruction to same or different hardware, firmware, software, or any combination thereof execution code from application Y to perform an action, wherein application Y includes logic to allow the action to be performed. For example, if a directed graph application instructs a web browser to render a web page for a display, a web server, on which the directed graph application is running, can execute code for the directed graph application and in response transmit an instruction to a client computer, on which the browser application is running, to render a web page to be displayed at a display of the client computer.

As used herein, the terms "comprises," "comprising," "includes," "including," "has," "having," and any variations thereof, are intended to cover a non-exclusive inclusion. For example, a method, process, article, or appliance that comprises a list of elements is not necessarily limited to only those elements but may include other elements not expressly listed or inherent to such method, process, article, or appliance. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one, and the singular also includes the plural unless it is obvious that it is meant otherwise.

Unless otherwise defined, all technical and scientific terms used herein have the same meaning as commonly understood by one of ordinary skill in the art to which this invention belongs. Although methods, hardware, software, and firmware similar or equivalent to those described herein can be used in the practice or testing of the present invention; suitable methods, hardware, software, and firmware are described below. All publications, patent applications, patents, and other references mentioned herein are incorporated by reference in their entirety. In case of conflict, the present specification, including definitions, will control. In addition, the methods, hardware, software, and firmware, and examples are illustrative only and not intended to be limiting.

Unless stated otherwise, any combination of one or more hardware components, one or more firmware components, or one or more software components, such as those illustrated in FIG. 1, may be bi-directionally or uni-directionally coupled to each other. Coupling should be construed to include direct electrical connections and any one or more of intervening switches, resistors, capacitors, inductors, and the like between any two or more components.

To the extent not described herein, many details regarding specific network, hardware, software, firmware components and acts are conventional and may be found in textbooks and other sources within the computer, information technology, and networking arts.

Before discussing details of the embodiments of the present invention, a non-limiting, illustrative hardware architecture for using embodiments is described. After reading this specification, skilled artisans will appreciate that many other hardware architectures can be used in carrying out embodiments described herein.

FIG. 1 includes an illustration of a system that can be implemented with respect to a method of using a directed graph. In one embodiment, the directed graph includes a workflow, such as a project workflow or a strategy workflow. The directed graph is not limited to workflows, and in another embodiment, can be a chart or other graph having a principal direction of flow from an initial point to a terminal point.

The system can include a client computer 11 that is bi-directionally coupled to a monitor 12 and a network 13. The system can also include a web server 14 that is bi-directionally coupled to networks 13 and 15. The networks 13 and 15 may be the same or different networks. For example, the network 13 can be the Internet, and the network 15 can be an internal network for an entity. The network 15 can be bi-directionally coupled to a database 16 and an application server 17.

In one implementation, the client computer 11 may include a central processing unit ("CPU") 110, a read-only memory (ROM) 112, a random access memory ("RAM") 114, a hard drive ("HD") or storage memory 116, and input/output device(s) ("I/O") 118. The I/O 118 can include a keyboard, printer, electronic pointing device (e.g., mouse, trackball, etc.), or the like. The monitor 12 can be part of the I/O 118, but is illustrated separately in order to more clearly describe the method and information that may be displayed at the monitor 12.

The web server 14 may include a central processing unit ("CPU") 140, a read-only memory (ROM) 142, a random access memory ("RAM") 144, a hard drive ("HD") or storage memory 146, and I/O 148. The I/O 148 can include a keyboard, a monitor, printer, electronic pointing device (e.g., mouse, trackball, etc.), or the like. The application server 17 may include a central processing unit ("CPU") 170, a read-only memory (ROM) 172, a random access memory ("RAM") 174, a hard drive ("HD") or storage memory 176, and I/O 178. The I/O 178 can include a keyboard, monitor, printer, electronic pointing device (e.g., mouse, trackball, etc.), or the like. Although not illustrated, other connections and additional memory may be coupled to or reside within each of the client computer 11, the web server 14, the application server 17, or any combination thereof. The web server 14, the application server 17, or both can be standalone server computers or may be one or more blades within a distributed computing environment.

The database 16 may reside external to the web server 14 and the application server 17, as illustrated in FIG. 1, or may reside on HD 146 (web server 14) or HD 176 (application server 17) if the database is not too large. The database 16 can include nearly any type of information within one or more database tables. In one embodiment, the database 16 may also include logic used in carrying out any one or more portions of the methods described herein.

Each of the client computer 11, the web server 14, the application server 17, or any combination thereof is an example of a data processing system. ROM (112, 142, 172), RAM (114, 144, 174), HD (116, 146, 176), and the database 16 include media that can be read by the CPUs (110, 140, 170). Therefore, each of these types of memories includes a data processing system readable medium. These memories may be internal or external to the client computer 11, the web server 14, the application server 17, or any combination thereof.

Portions of the methods described herein may be implemented in suitable software code that includes instructions for carrying out the methods. In one embodiment, the instructions may be lines of assembly code or compiled C++, Java, or other language code. Part or all of the code may be stored within memory of the client computer 11, the web server 14, the database 16, the application server 17, or any combination thereof and executed by one or more CPU within the client computer 11, the web server 14, the application server 17, or any combination thereof. In another embodiment, the code may be contained on a data storage device, such as a magnetic tape, floppy diskette, CD ROM, optical or other storage device, storage network, other appropriate data processing system readable medium, or any combination thereof.

Other hardware architectures may be used. More or fewer servers may be present in other embodiments. For example, the functions of the web server 14 may be performed at least in part by the application server 17, or vice versa. Additionally, a software program or its software components with such code may be embodied in more than one data processing system readable medium in more than one computer or server. After reading this specification, skilled artisans appreciate that many other configurations are possible. The configuration illustrated in FIG. 1 or described herein is to be viewed as exemplary and not limiting.

Attention is now directed to specific aspects of using the directed graph with respect to the system illustrated in FIG. 1. For simplicity, all actions regarding editing the directed graph performed are from the perspective of the web server 14 unless stated otherwise. The web server 14 can render information that will be displayed at the monitor 12.

Figure 2:
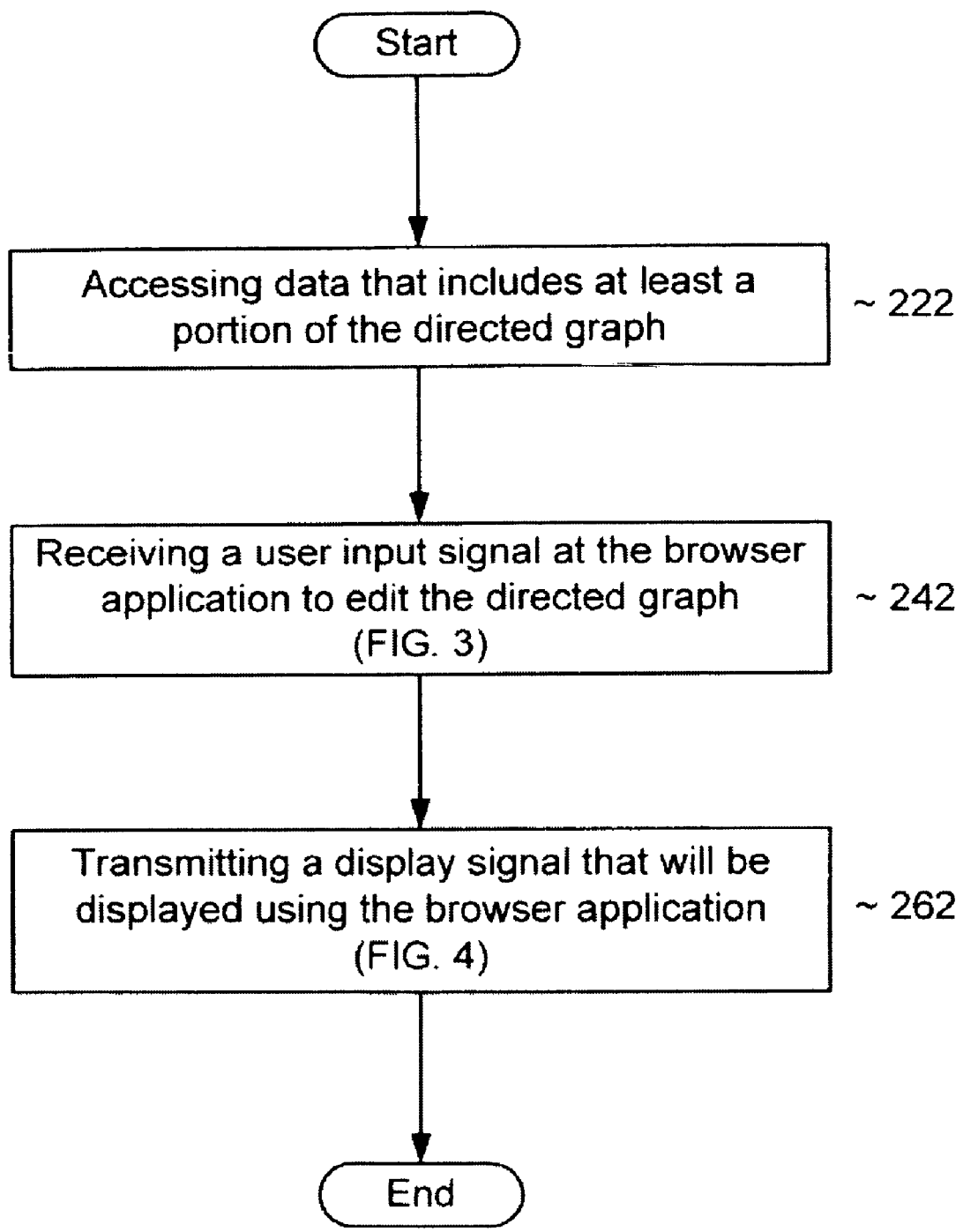
FIG. 2 includes a flowchart for a software program that can be run using a browser application with the directed graph in accordance with an embodiment.
Figure 3:
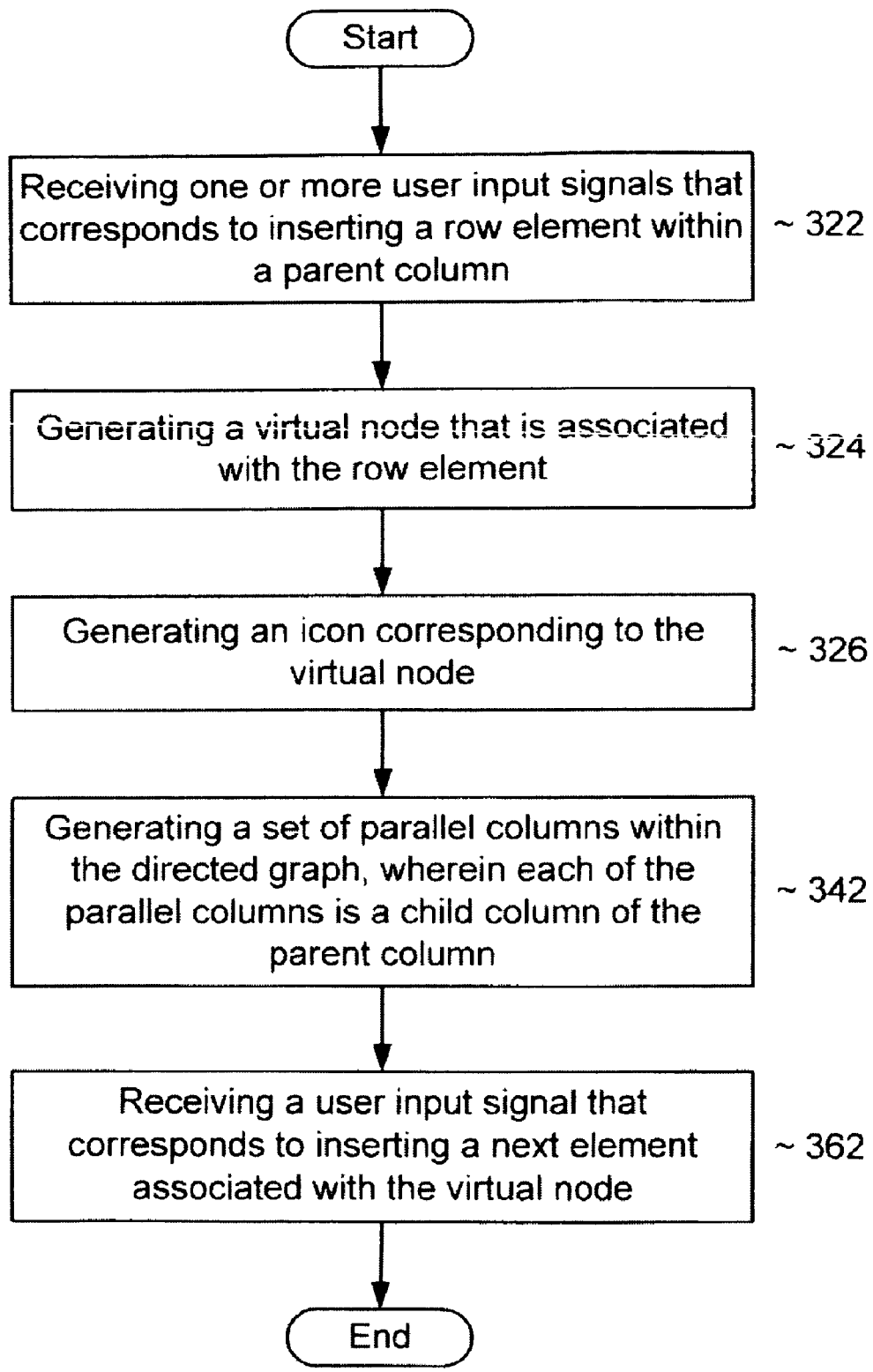
FIG. 3 includes a flowchart for a detailed portion of the software program in FIG. 2 while editing the directed graph.

In one embodiment illustrated in FIG. 2, the method can include accessing data that includes at least a portion of the directed graph, at block 222, receiving a user input signal at the browser application to edit the directed graph, at block 242, and transmitting a display signal that will be displayed using the browser application, at block 262. FIG. 3 includes more details regarding editing the directed graph, and FIG. 4 includes more details regarding generating and transmitting a display signal that can be received by the client computer 11 and displayed on the monitor 12.

Referring to block 222, accessing the data can include retrieving one or more files from HD 116, HD 146, HD 176, or database 16 and loading the file(s) into memory at CPU140, ROM 142, RAM 144, or any combination thereof. Accessing the data can also include receiving user input signals via I/O 118 (e.g., keyboard, electronic pointing device, etc.) at the client computer 11 and generating the directed graph that is initially created by CPU140 and lies within memory at CPU140, ROM 142, RAM 144, or any combination thereof. Therefore, accessing should be broadly construed to cover nearly any manner of obtaining data regarding the directed graph or a portion thereof.

Figures 5, 6:
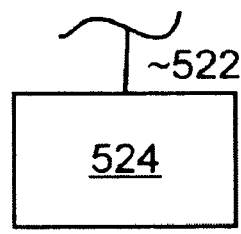
FIG. 5 includes a portion of a directed graph that includes an action element.
FIG. 6 includes a portion of a database table that can be used with the directed graph in FIG. 5.

FIGS. 5 and 6 include illustrations of a portion of data tables that include data for the directed graph that includes a column 522 and an action element 524. Action element 524 can include an action, a name or automatic indicator, a status, other information, or any combination thereof. FIG. 5 can include the portion of the directed graph as it is seen by an editor at the monitor 12 when the directed graph runs using a browser application, such as Netscape Navigator™, Safari™, Internet Explorer™, Eudora™ brand browser application, or the like on the client computer 11. The data used for generating the display illustrated in FIG. 5 can be rendered by the web server 14 into a web page and transmit a display signal to the client computer 11. The client computer 11 can receive the display signal and use the browser application at the client computer 11 to generate the display at monitor 12.

FIG. 6 includes an example of table 522 that includes data for the portion of the directed graph corresponding to column 522. Within the database 16, table 522 can include elements, wherein each element for the directed graph can include an attribute that identifies the element as being an action element, a column element, or a row element. In the data model, the column 522 can be represented by a column element, and action element 524 can include an attribute that identifies it as being an action element and includes a reference to column 522. Other action or row elements under the column element (for column 522) can be sequentially numbered or otherwise ordered, with action element 524 being the currently last element associated with or corresponding to column 522.

Figures 7, 8:
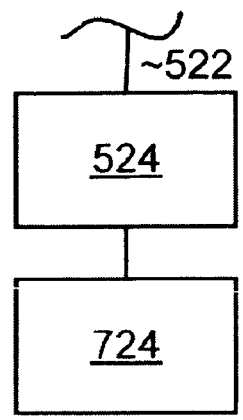
FIG. 7 includes the portion of the directed graph in FIG. 5 after adding another action element.
FIG. 8 includes the portion of the database table after transforming or otherwise converting the other action element in FIG. 7 to a row element.

The method can include receiving one or more user input signals that corresponds to inserting a row element within a parent column, at block 322 in FIG. 3. The editor at client computer 11 can enter keystrokes, mouse clicks, etc. using I/O 118 that are received at the browser application and are transmitted from the client computer 11 to the web server 14. In one embodiment, the editor at client computer 11 can click on or otherwise activate the action element 524 (or a virtual node if a row element would be the immediately preceding element), right click and select "insert under." The sequence can correspond to an insert under command that is executed by the web server 14 and initially creates action element 724 as illustrated in FIG. 7.

The editor at client computer 11 can enter additional keystrokes, mouse clicks, etc. using I/O 118 that are received at the browser application and are transmitted from the client computer 11 to the web server 14. In one embodiment, the editor at client computer 11 can click on or otherwise activate the action element 724, right click and select "insert right." The sequence can correspond to an insert right command that is executed by the web server 14. From action element 724, the insert right command is used to note that a plurality of parallel columns is being formed initially including action element 724 in one column and a newly created action element in a second column. The two columns together comprise a new row element 824 that is also created by this "insert right" command, which takes the place of action element 742 as the second element of the column 522 as illustrated in FIG. 8.

In another embodiment, the row element 824 can be generated without having to first generate the action element 724. In still another embodiment, the action element 724, the row element 824, or both may be generated automatically by the web server 14 or generated in response to a dialog between the web server 14 and one or more other parts of the data processing system, the editor at client computer 11, or any combination thereof. After reading this specification, skilled artisans will appreciate that different names for the commands can be used, that the commands may be changed (e.g., "insert right" command if a column within a row element is conditionally performed and "insert left" command if a column within the row element is not conditionally performed (i.e., will be performed)), additional or alternative editing commands might be provided such as an "insert above" command to add an element above the indicated element (becoming its immediate predecessor and becoming the successor to the element previously its predecessor), the order in which the directed graph is generated can be changed, or any combination thereof can be performed without departing from the scope of the present invention.

The method can also include generating a virtual node that is associated with the row element (block 324 of FIG. 3) and generating an icon corresponding to the virtual node (block 326). The generation of the virtual node and its corresponding icon can be automatically performed by the web server 14 at the same time or shortly after the row element is created. The virtual node can be used to establish a reconnection point from last elements within columns for a set of parallel columns associated with or corresponding to row element 824 along column 522. The icon allows an editor of the directed graph a way to attach a next element below the row element. The virtual node and its use are described more later in this specification.

Figures 9, 10:
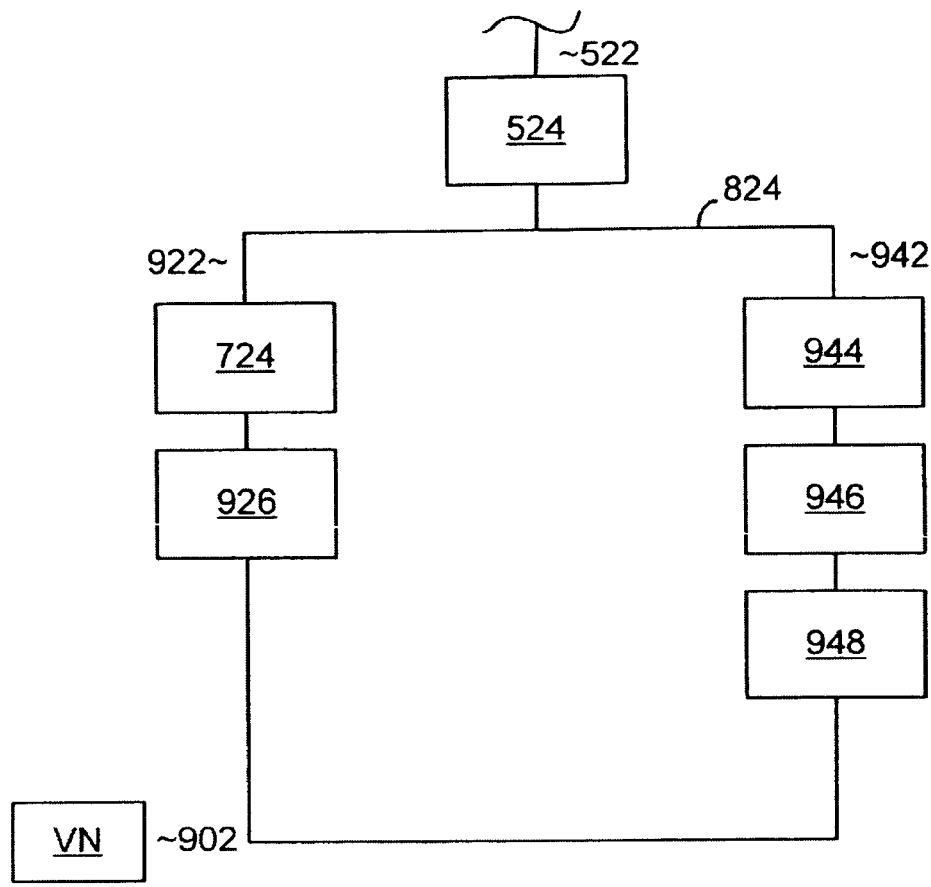
FIG. 9 includes the portion of the directed graph after adding columns and action elements corresponding to the row element.
FIG. 10 includes the portion of the database table of FIG. 8 after adding a virtual node associated with the row element.

The method can further include generating a set of parallel columns within the directed graph, wherein each of the parallel columns is a child column of the parent column (block 342). The editor at client computer can use I/O 118 to generate a user input signal that is received at the browser application and is transmitted from the client computer 11 to the web server 14. User input signal from client computer 11, data from the web server 14, the database 16, the application server 17, or any combination thereof can be used to create columns corresponding to columns 922 and 942, as illustrated in FIG. 9. A series of insert under commands can be performed in generating action elements 724 and 926 that lie along column 922, and action elements 944, 946, and 948 that lie along column 942. After reading this specification, skilled artisans will appreciate that more or fewer action elements may lie within each column and any one or more of the action elements could be replaced by one or more row elements.

Referring to FIG. 9, row element 824 includes columns 922 and 942 together. Columns 922 and 942 are child columns of parent column 522. Each of action elements 724 and 926 can include a reference to column 922, and each of action elements 944, 946, and 948 can include a reference to column 942. Columns 922 and 942 can include a reference to row element 842, and the row element 842 can include a reference to column 522.

FIGS. 10 to 13 include illustrations of data that may be included within tables of database 16. Table 522 in FIG. 10 represents the data for the parent column 522 and includes action element 524, row element 824, and virtual node 902. In another embodiment, the virtual node 902 might not be stored in the database 16, but might be generated by the software in RAM 144 based on the row element 824. Table 824 in FIG. 11 corresponds to the row element 824 and includes column elements 922 and 942 that correspond to the set of parallel columns that are children columns of the parent column 522. Table 922 in FIG. 12 corresponds to the column element 922 and includes action elements 724 and 926, and table 942 in FIG. 13 corresponds to the column element 942 and includes action elements 944, and 946, and 948.

Each of FIG. 10 to 12 illustrates the child elements comprising a particular parent element, with the parent element identifier appearing above the headers for the data, but the parent element identifier and the identifier for the whole directed graph may be represented as additional columns in the data table, allowing all of the elements to be in a single data table for all the directed graphs of concern to the system. Skilled artisans will appreciate that many alternate data representations are possible, such as having separate tables based on element types, or having one table containing all elements and all data relevant for all element types, while having additional tables for data relevant for specific element types.

The method can further include receiving a user input signal that corresponds to inserting a next element associated with the virtual node (block 362 in FIG. 3). In one embodiment, the editor at client computer 11 can click on or otherwise activate the virtual node 902 that is illustrated in FIG. 9. The editor can right click and select insert under to generate a user input signal that is received at the browser application and transmitted from the client computer 11 to the web server 14. The web server 14 can interpret the user input signal to be an insert under command to add action element 1424 below row element 824. The web server 14 includes logic so that it recognizes the user input signals from the client computer 11 as editing the directed graph to add the action element 1424 to the directed graph, wherein the action element 1424 will be activated after the row element 824 is completed.

Figures 14, 15:
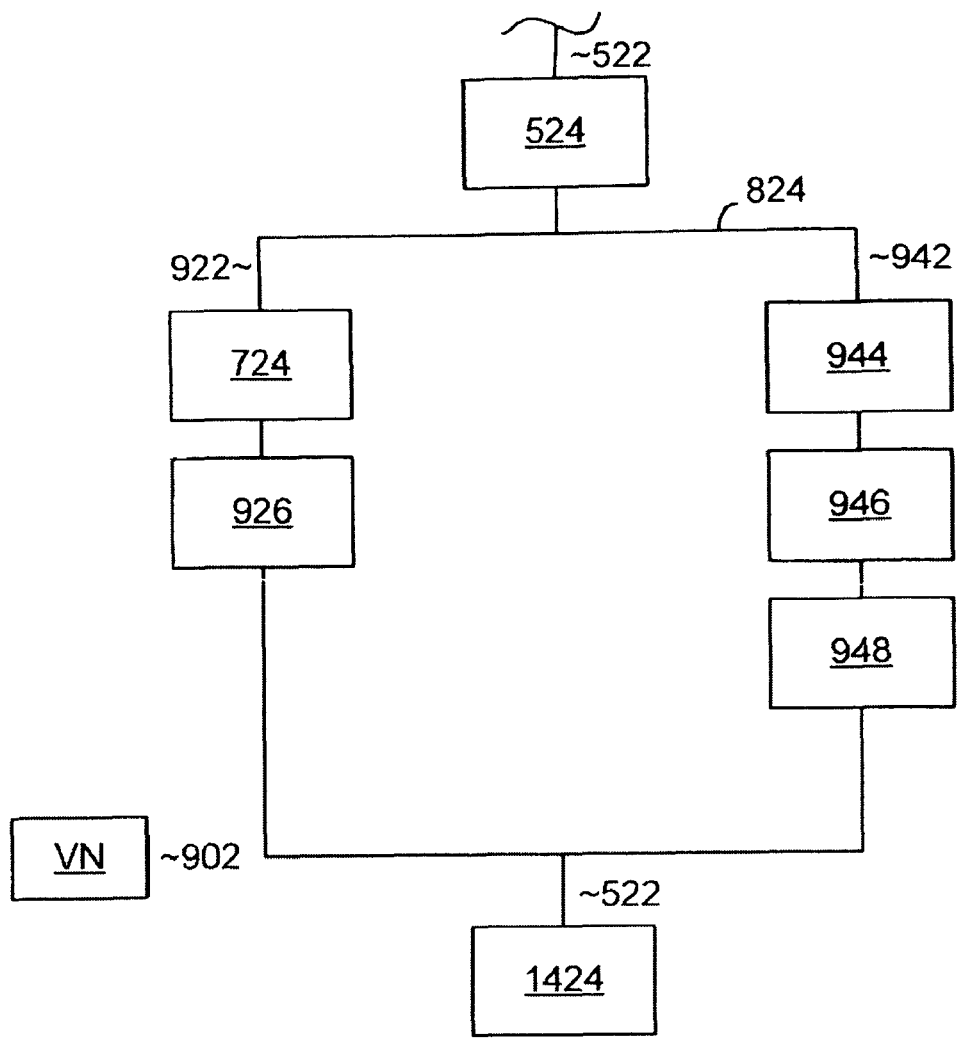
FIG. 14 includes the portion of the directed graph in FIG. 9 after adding an action element after the row element.
FIG. 15 includes the portion of the database table of FIG. 10 after adding the action element after the virtual node.

FIG. 15 includes table 522 that illustrates that the row element 824 is the immediately preceding element with respect to action element 1424. The virtual node 902 is not an element for the purposes of this specification because it cannot be activated and completed or bypassed like other elements, such as action elements, column elements, and row elements.

The editing process can be continued to add other elements to the directed graph. The elements may be added nearly anywhere within the directed graph. The other elements can include adding one or more other actions or row elements to any column element, or one or more other columns to any row element. Editing can also include deleting, replacing, or otherwise modifying any of the action, column or row elements, "cut and paste" operations to move an action or element from one position to another within a directed graph, or any combination of these editing actions. In one particular embodiment, row elements may be nested. In other words, a row element may include a column that includes another row element. After reading this specification, skilled artisans will appreciate that the basic tools for editing a directed graph have been described and complex directed graphs can be generated.

In one particular embodiment, additional rules may be imposed to restrict the editing process if certain actions have logical restrictions on where they should or should not be allowed in relation to parallel columns. The method can restrict certain actions such that they cannot be part of a parallel process, if it is undesirable or unreasonable for that to be allowed, by not allowing such actions to be inserted within a row or any element descended from a row, and by not allowing an "insert right" operation against an existing action of such type, to prevent it from being converted into an element of a row. The method can also restrict the allowed position of certain actions in relation to the specific positions of other related actions. In one particular embodiment, one type of action might be the approval of another action, and editing rules could insure that the approval could only be inserted or moved to a new position as a direct or indirect successor of the action being approved, to insure that the approval action is never presented to a user for performance, before the action being approved has itself been performed.

Attention is now directed to an exemplary, non-limiting embodiment for generating a display signal that can be displayed at the monitor 12 at client computer 11 when using a browser application. Browser applications are good at working with lists, tables, and blocks, however, browser applications (and markup languages in particular) are not good at connecting blocks with lines. The web server 14 can include conventional logic to determine the lengths of lists, and dimensions (lengths and widths) for blocks. This capability can be leveraged in order to provide a user-friendly graphical representation of the directed graph that can be displayed at monitor 12 using the browser application at client computer 11. In one embodiment, the directed graph is a workflow, such as a project workflow or a strategy workflow. The focus of this particular embodiment will be regarding the directed graph as illustrated in FIG. 14. For simplicity, the directed graph includes a main or parent column and only one row element.

In another embodiment, more row elements and associated parallel columns may be present. Unless stated otherwise, the method described for generating the display signal can be performed by the web server 14. The web server 14 may have information regarding the operating system and browser application used at the client computer 11. This information can be used by the web server 14 in rendering a web page for the client computer 11. Different embodiments can be used to display the directed graph at monitor 12. Details regarding some of the embodiments are described below. The scope of the present invention is not limited to the detailed embodiments described herein. The methods can leverage the functionality provided within conventional browser applications to generate blocks with borders from cells within a table, can center objects within cells, can generate substantially centered, substantially vertical lines within cells of a table, and can determine lengths of columns, so that rows within tables are properly aligned.

Figure 16:
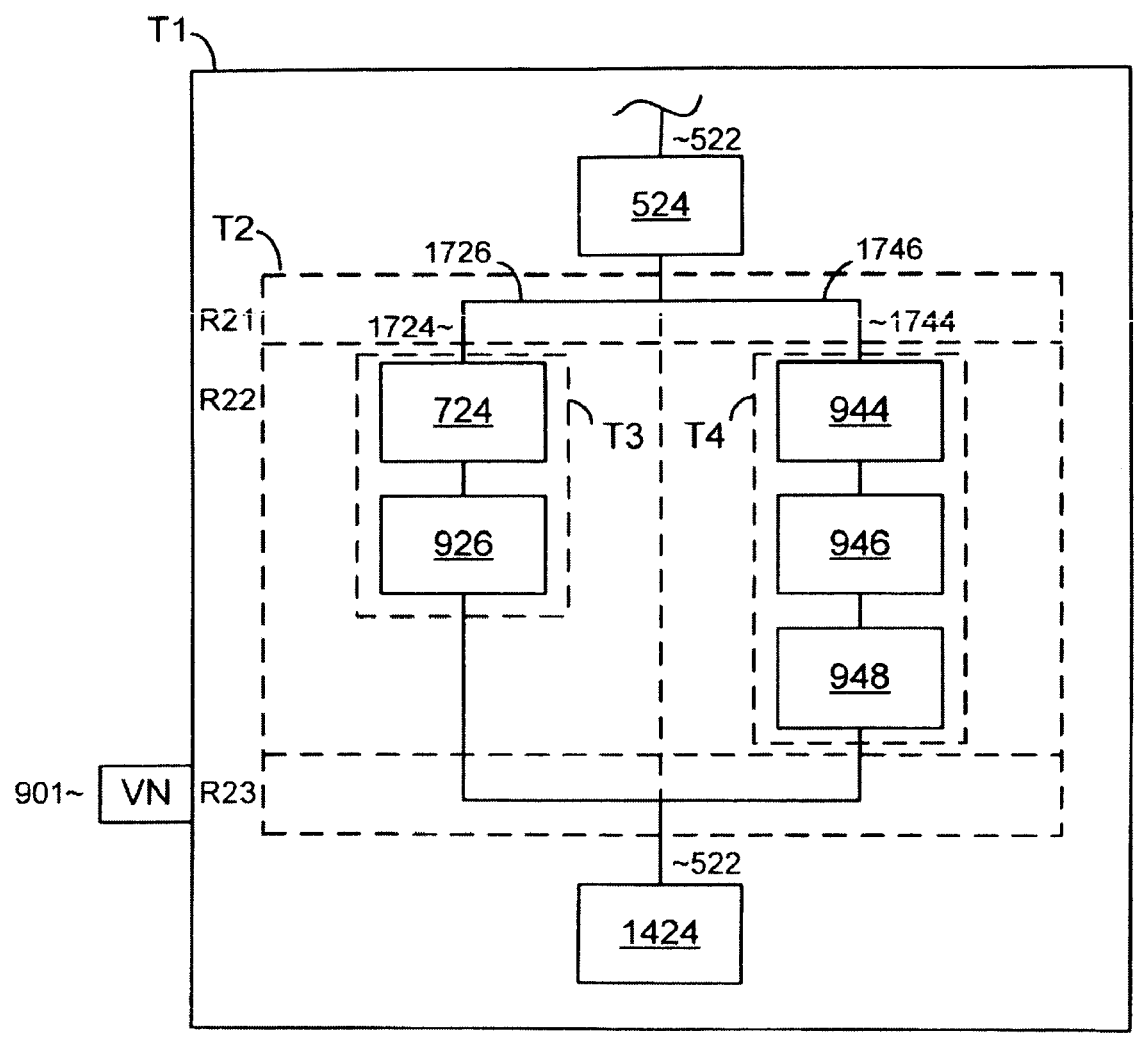
FIG. 16 includes an illustration of data and table relationships for generating the portion of the directed graph in FIG. 14.

FIG. 16 illustrates information that can be used to generate the directed graph as illustrated in FIG. 14. The information includes tables embedded within tables. The parent column element 522 corresponds to table 522, which is noted as T1 in FIG. 16. The row element 824 corresponds to table 824, which is noted as T2. Each column element 922 and 942 corresponds to tables T3 and T4, respectively. In this embodiment, tables T3 and T4 are embedded within table T2, which is embedded within table T1.

Regarding table T2, the software application used for generating and using the directed graph (directed graph application) can instruct the browser application to create a table within a markup language, such as HTML, for example. In a particular embodiment, table T2 includes three rows, namely, R21, R22, and R23, and a number of columns corresponding to the number of column elements within the row element 824, which in this particular example is two columns. The directed graph application can instruct the browser application to embed the column elements 922 and 942 within R22 of T2 at the appropriate location.

Figure 4:
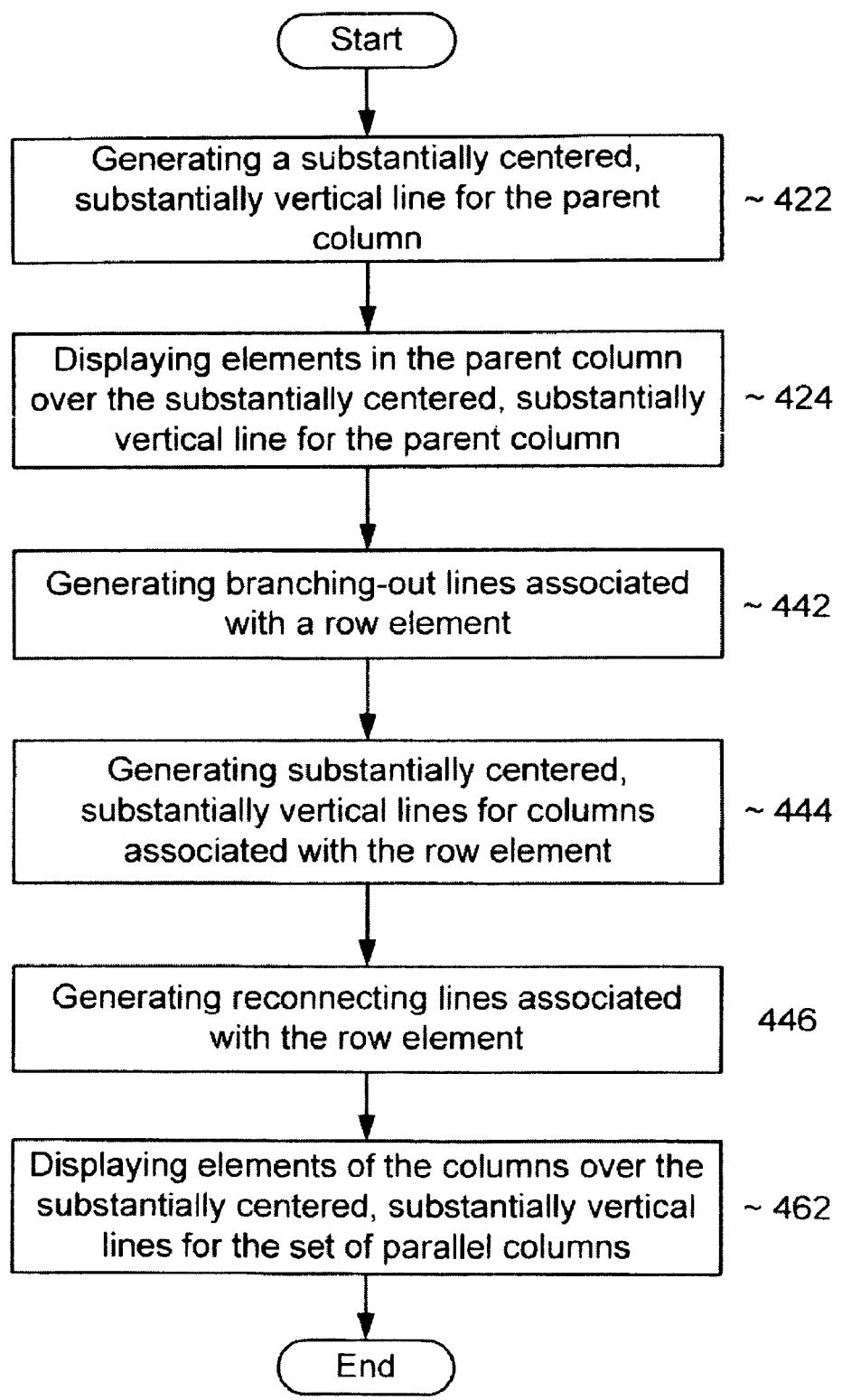
FIG. 4 includes a flowchart for a detailed portion of the software program in FIG. 2 while generating a display signal for the directed graph.

The directed graph application can instruct the browser application to generate a substantially centered, substantially vertical line 522 for the parent column (block 422 in FIG. 4). The centering is in a horizontal direction with respect to the width of T1. The directed graph application can also instruct the browser application to display the elements in the parent column over the substantially centered, substantially vertical line for the parent column 522 (block 424). In one particular embodiment, the elements of table 522 are centered with respect to the horizontal direction within table T1. At the display 12, each of action element 524, table T2, and action element 1424 are centered within their respective cells and are displayed over the substantially vertical line 522.

Figure 17:
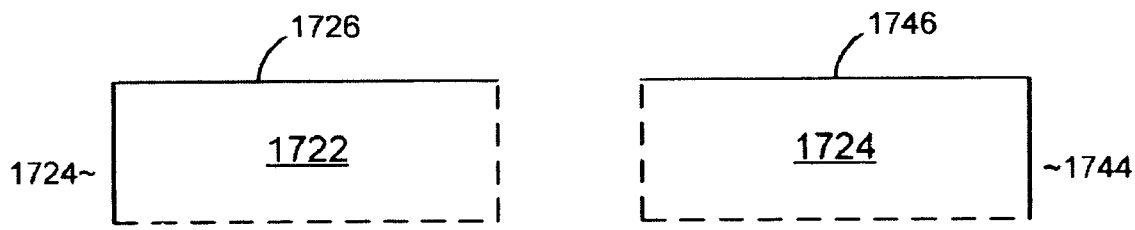
FIG. 17 includes an illustration of blocks that can be used to generate branching-out lines in accordance with one embodiment.

The directed graph can instruct the browser application to generate branching-out lines associated with the row element (block 442 in FIG. 5). Regarding table T2, the directed graph application can instruct the browser application draw borders around the cells in R21 in table T2. FIG. 17 includes illustrations of block 1724 that includes a left side border 1724 and a top border 1726 for the left-hand cell of row R21, and 1742 that includes a right side border 1744 and a top border 1746 for the right-hand cell of row R21. In one embodiment, only the left side border 1724 and the top border 1726 of block 1722 may be turned on or otherwise activated, and only the right side border 1744 and the top border 1746 of block 1742 may be turned on or otherwise activated.

For each of the blocks 1722 and 1742, the directed graph application instructs the browser application to offset (1) the side borders by half the horizontal dimension of the cell in a direction toward the centerline for table T1 and (2) the top borders by half the vertical dimension of the cell in a direction toward the next row R22 in table 2. Regarding the block 1722, half of the left side border 1724 and half of the top border 1726 will be displayed. In this manner, the branching-out lines can be displayed. In one embodiment, after the borders are moved with respect to the display, the substantially vertical lines line extending to the branching out lines can be displayed.

The directed graph application can further instruct the browser application to generate substantially centered, substantially vertical lines for columns associated with the row elements (block 444 in FIG. 4). In a particular embodiment, the browser application receives an instruction to generate a substantially centered, substantially vertical line within each cell of row R22.

The directed graph application can instruct the browser application to generate reconnecting lines associated with the row element (block 446 in FIG. 4). As compared to the branching-out lines, a substantially similar method can be used for generating the reconnecting lines within row R23. The bottom and side borders are turned on or otherwise activated for row R23. The bottom borders will be offset towards the top of the table T2, rather than towards the bottom of table T2 (as performed for the blocks 1722 and 1742 in row R21). Therefore, at least the bottom borders of the cells for row R23 are generated in addition to or in place of the top borders 1726 and 1746.

The directed graph application can instruct the browser application to display elements of the columns over the substantially centered, substantially vertical lines for the set of parallel columns (block 462 in FIG. 4). The actual contents of the columns 922 and 942 will be displayed as tables T3 and T4, respectively. The embedded browser tables have differing numbers of rows corresponding to the number of elements in each column element. When displayed, the substantially centered, substantially vertical lines in cells for row R22, including tables T3 and T4 and portions of cells for rows R21 and R23 will be rendered by the browser application to display substantially vertical lines that are substantially parallel to each other and connect to the branching-out and reconnecting lines. The action elements 724 and 926 are displayed over the left-side line, and the action elements 944, 946, and 948 are displayed over the right-side line.

In this embodiment, the information regarding tables and borders of tables in FIG. 16 may not be displayed at monitor 12. In such an embodiment, the monitor 12 will display the portion of the directed graph, as illustrated in FIG. 14.

In another alternative embodiment, row R22 can be replaced by a set of rows, wherein each row corresponds to an element within the longest column. Referring to column 942, it has three elements. Therefore, table T2 would have still have two columns, but would have five rows as opposed to three rows in the prior embodiment. For the first two of the middle three rows, each cell in table T2 would have an action element. In the third of the middle three rows, the left-hand cell would only have a centered, substantially vertical line with no corresponding element, and the right-hand cell would have action element 948 displayed over its corresponding centered, substantially vertical line.

Figure 18:
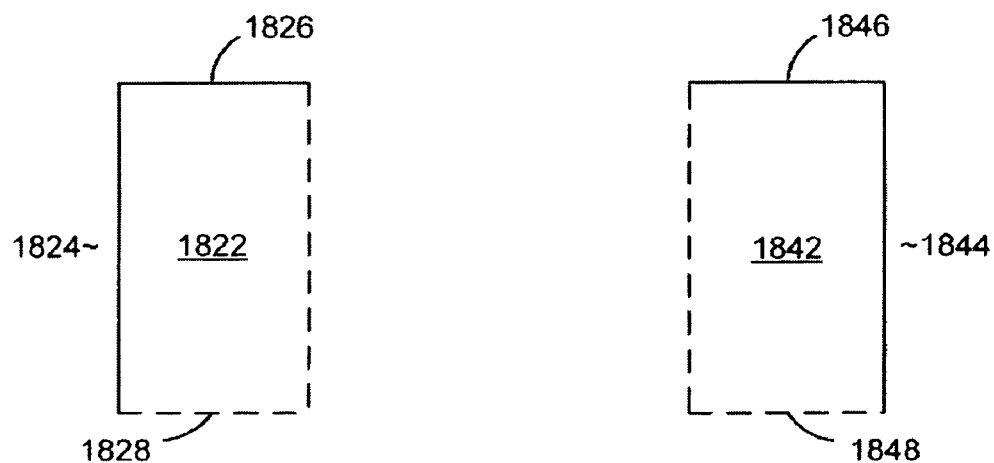
FIGS. 18 to 20 include illustrations for generating lines that will be used generating a display signal for the directed graph.

In still a further embodiment, a different method can be used to generate the branching-out lines, set of substantially centered, substantially vertical lines for the set of parallel columns. In this embodiment, borders for the cells in row R22 can be used. The directed graph application can instruct the browser application to generate at least portions of blocks for each cell within the row R22. FIG. 18 includes blocks 1822 and 1842 that can be used for columns 922 and 942, respectively. The blocks 1822 and 1842 that have substantially the same length. The width of block 1822 can be determined by the browser application determining the width of action element 724, 926, or a combination thereof, and the width of block 1842 can be determined by measuring the width of action element 944, 946, 948, or any combination thereof.

In one particular embodiment, child column 922 will be placed to the left of the parent column 522, and child column 942 will be placed to the right of the parent column 522. For child column 922, the left border 1824 and the top border 1826 of block 1822 are used. For child column 942, the right border 1844 and the top border 1846 of block 1842 are used. The dashed lines 1828 and 1848 for blocks 1822 and 1842, respectively, represent the other sides of the blocks that will not be seen by at the monitor 12 when displayed.

Figure 19:
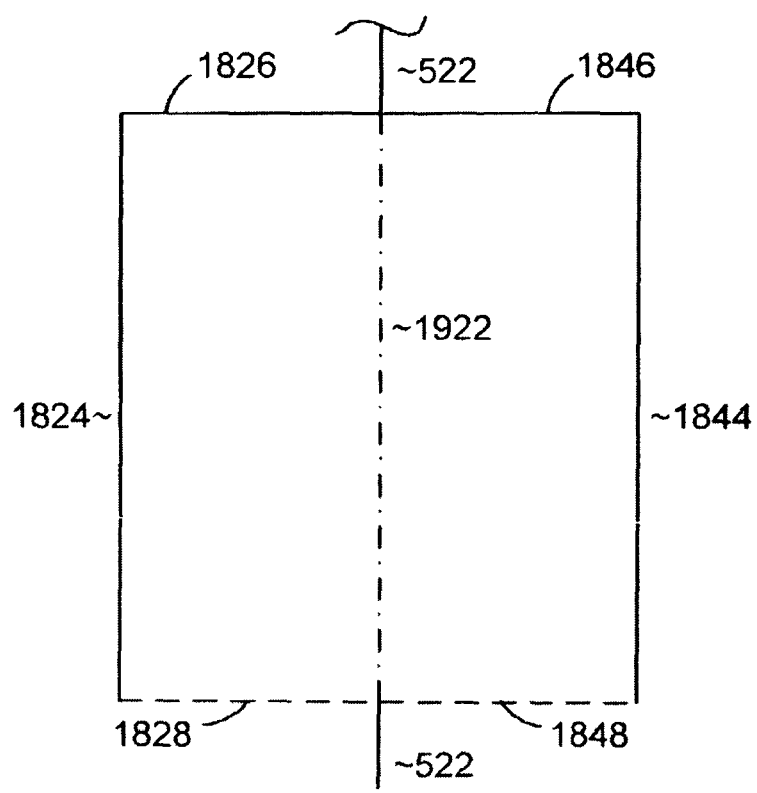

The directed graph application can also instruct the browser application to offset the blocks. Block 1822 can be offset one half of the column width to the right and up by half the distance along a vertical axis between where action element 524 and action element 724 will be located. Block 1842 can be offset one half of the column width to the left and up by half the distance along a vertical axis between where action element 524 and action element 944 will be located. Block 1822, block 1842, or both overlap the parent column 522. From a display perspective, line-dash-line portion 1922, in FIG. 19, of the parent column 522 underlies or is covered by the block 1822, block 1842, or both. At monitor 12, portion 1922 and the dashed lines 1828 and 1848 are not displayed but are illustrated in FIG. 19 to simplify understanding of the methodology described herein.

The columns 922 and 942 are to be reconnected back to the parent column 522. The directed graph application can instruct the browser application to copy blocks 1822 and 1842. The copies are substantially the same as their corresponding blocks except that the bottom borders, rather than the top borders are included. From the original location of cells within row R22, the copy of block 1822 can be offset one half of the column width to the right and down by half the distance along a vertical axis between where action element 948 and action element 1424 will be located. The copy of block 1842 can be offset one half of the column width to the left and down by half the distance along a vertical axis between where action element 948 and action element 1424 will be located.

Figure 20:
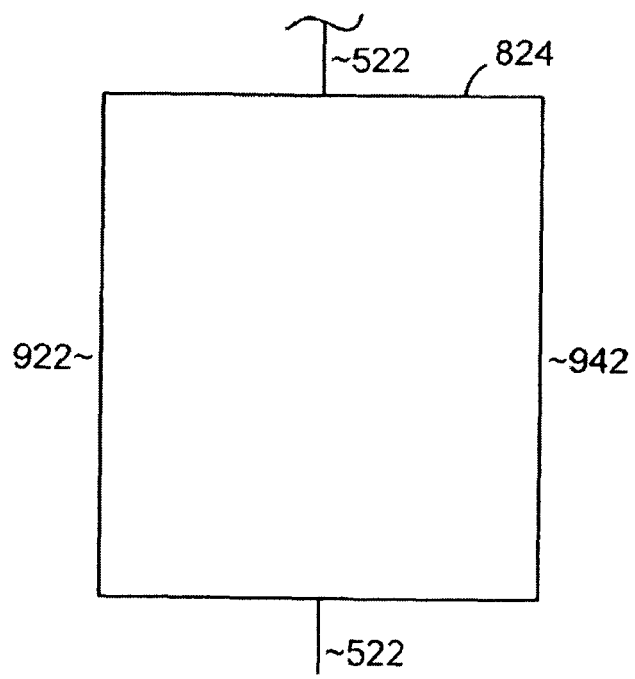

FIG. 20 includes an illustration of how the lines from the blocks will appear. The combinations of borders from the blocks create an illusion of the diverging paths and reconnecting point for row element 824. Column 922 can include a substantially vertical line that corresponds to the left side borders of block 1822 and its copy, and column 942 can include a substantially vertical line that corresponds to the right side borders of block 1842 and its copy. From a presentation standpoint, the substantially vertical line corresponding to the parent column 522 is substantially continuous, but a portion is not seen at monitor 12 because the line for parent column 522 underlies or is covered by portions of blocks 1822, 1842, or any combination thereof.

Other methods may be used to generate the display of the portion of the directed graph in FIG. 14. After reading this specification, skilled artisans can determine how to generated the lines and elements in a display to meet their needs or desires.

The method can also include generating an icon 902 for the virtual node associated with the row element 824. The icon 902 can be placed near the reconnection points for the set of parallel columns, as illustrated in FIG. 14. The icon 902 can be a graphical indicator used by an editor at client computer 11. The use of the icon 902 is described above.

The methodology described herein can be extended to a simpler or more complex directed graph. Row elements can be nested to nearly any level. The logic herein can be used to determine lengths of the longest columns for the most deeply nested row element and work towards less deeply nested row elements to determine lengths of columns and lengths of gaps within parent columns between action elements along a parent column. The method can be iterated until the main column is reached. The ordering of lines for the directed graph can be such that children columns are presented as overlying their parent column. In one embodiment, the children columns may be in the foreground compared to the parent column, or the parent column may be in the background compared to the children columns.

After the editor has completed work on the directed graph, an actor can use the directed graph in executing a workflow, such as a project workflow or a strategy workflow. A reviewer (still another user at client computer 11) can use the directed graph in reviewing the status of actions within the directed graph. The use of a browser application allows monitor 12 to display the workflow to an editor in a similar format, as it will be seen when the actor executes actions requested in the workflow. Some differences can be seen between the display for the editor and the display for the actor. For example, the display for the editor may include the virtual node icon 902 that may not be displayed to the actor. Also, the status information may be displayed to the actor but not to the editor during editing the directed graph.

The ability for the editor to use a browser application to edit the directed graph allows the editor a better ability to see the directed graph in a format closer to what an actor will see. The editor does not need to use an editing application to edit the directed graph and a browser application to check the visual appearance of the directed graph. In this manner, the editor can more quickly generate a directed graph with better confidence that the directed graph that will be subsequently used will look similar to the display that the editor sees when editing. Therefore, generation of the directed graph can be performed more quickly and easily by using the browser application at client computer 11 rather than having to use at least two different applications at the client computer 11.

In one embodiment, many different types of client computers can be used with the client-server architecture, as illustrated in FIG. 1. Most of the data processing can be performed by the web server 14, the application server 17, or both. Thus, the web server 14 can render a web page for the particular operating system and browser application for a particular client computer. Therefore, special software does not need to be implemented on the client computers to use the methods and software described herein.

The ability to generate row elements with associated column elements allows better flexibility in executing on a directed graph because the actions associated with one column can be performed without having to wait for other actions in other columns. For example in FIG. 14, action elements 724 and 944 can be activated at substantially the same time. After action element 944 is completed, action element 946 can be activated without having to wait for action element 724. In one particular embodiment, action element 946 can be completed while action element 724 is still active (not completed). If the data model would only use rows of action elements, one row element would include action elements 724 and 944, another row element would include action elements 926 and 946, and still another row element would include action element 948. In this data model, action elements 724 and 944 are completed before action elements 926 and 946 are activated. While not a critical or essential element of the present invention, the embodiment having a row element with column elements may allow a directed graph to be executed more quickly than the other embodiment with separate rows having only action elements.

In another embodiment, references between elements can be different. As previously described, a reference between action elements can be indirect via one or more references to one or more column elements, sequential numbering within column element(s), one or more row elements, or any combination thereof. In another embodiment, references can be more direct. For example, action element 724, action element 944, or both may directly reference action element 524. Other methods of direct or indirect references can be used in other embodiments.

Any portion of all of the methods described herein may be performed by a computer, server, or other machine. Instructions can be generated that correspond to the operations described herein.

Many different aspects and embodiments are possible. Some of those aspects and embodiments are described below. After reading this specification, skilled artisans will appreciate that those aspects and embodiments are only illustrative and do not limit the scope of the present invention.

In a first aspect, a method can be used when a directed graph running on a browser application. The method can include accessing data that includes at least a portion of the directed graph and receiving a user input signal at the browser application to edit the directed graph.

In one embodiment of the first aspect, the method further includes transmitting a display signal to be displayed using the browser application, wherein the display signal corresponds to at least the user input signal. In another embodiment, the user input signal corresponds to adding an action element, a column element, or a row element. In a particular embodiment, the user input signal corresponds to adding a row element. The method further includes adding a set of parallel columns associated with the row element, wherein a first column within the set of parallel columns has a different number of elements compared to a second column within the set of parallel columns. The method still further includes generating a virtual node that is associated with the row element and represents a reconnection point for the set of parallel columns. In a more particular embodiment, the method yet further includes receiving a user input signal corresponding to accessing the virtual node and adding a next element that lies within a same column as the row element, wherein the row element is an immediately preceding element with respect to the next element.

In still another embodiment of the first aspect, the method further includes transmitting an instruction to a browser application to generate a first table corresponding to a row element. The first table includes a first row, at least one second row, a third row, and columns, wherein a number of the columns corresponds to the number of columns associated with the row element. The method still further includes transmitting an instruction to a browser application to generate lines to illustrate a set of parallel columns for the row element and transmitting an instruction to the browser application to display elements associated with the row element.

In a second aspect, a method of using a directed graph can include generating a row element and generating a virtual node that is associated with the row element.

In one embodiment of the second aspect, the method further includes generating a set of parallel columns associated with the row element, wherein a first column within the set of parallel columns has a different number of elements compared to a second column within the set of parallel columns. In a particular embodiment, the virtual node represents a reconnection point for columns within the set of parallel columns.

In another embodiment of the second aspect, the method further includes generating an icon corresponding to the virtual node and transmitting a display signal that includes the icon. In another particular embodiment, the method further includes receiving a user input signal that corresponds to inserting a next element associated with the virtual node. The row element and the next element are within the same column, and the row element is an immediately preceding element with respect to the next element. In still another embodiment of the second aspect, the directed graph includes a first row element that corresponds to the set of parallel columns, and a column within the set of parallel columns includes a second row element.

In a third aspect, a method of using a directed graph can including generating a row element that includes a first associated column element and a second associated column element, generating at least one first associated element within the first column element, and generating at least one second associated element within the second column element. The number of the first associated element(s) may be different from the number of the second associated element(s).

In one embodiment of the third aspect, the method further includes executing actions in accordance with the directed graph. The first associated column element includes a first action element, and the second associated column element includes a second action element and third action element. The first and second action elements lie at the same sequential position within the first and second associated column elements, respectively. The third action element is subsequent to the second action element, and the third action element is activated before the first action element is completed. In a particular embodiment, the third action element is completed before the first action element is completed.

In a fourth aspect, a data processing system readable medium can have code to use a directed graph, wherein the code is embodied within the data processing system readable medium. The code can include an instruction to access data that includes at least a portion of the directed graph and an instruction to edit the directed graph in response to receiving a user input signal at the browser application.

In one embodiment of the fourth aspect, the code further includes an instruction to transmit a display signal to be displayed using the browser application, wherein the display signal corresponds to at least the user input signal. In another embodiment, the user input signal corresponds to adding an action element, a column element, or a row element. In a particular embodiment, the user input signal corresponds to adding a row element. The code further includes an instruction to add a set of parallel columns associated with the row element, wherein a first column within the set of parallel columns has a different number of elements compared to a second column within the set of parallel columns, and an instruction to generate a virtual node that is associated with the row element and represents a reconnection point for the set of parallel columns. In a more particular embodiment, the code further includes an instruction to access the virtual node and an instruction to adding a next element that lies within a same column as the row element, wherein the row element is an immediately preceding element with respect to the next element.

In still another embodiment of the fourth aspect, the code further includes an instruction to generate a first table corresponding to a row element. The first table includes a first row, at least one second row, a third row, and columns, wherein a number of the columns corresponds to the number of columns associated with the row element. The code still further includes an instruction to generate lines to illustrate a set of parallel columns for the row element and an instruction to display elements associated with the row element.

In a fifth aspect, a data processing system readable medium can have code to use a directed graph running on a browser application, wherein the code is embodied within the data processing system readable medium. The code can include an instruction to generate a row element and an instruction to generate a virtual node that is associated with the row element.

In one embodiment of the fifth aspect, the code further includes an instruction to generate a set of parallel columns associated with the row element, wherein a first column within the set of parallel columns has a different number of elements compared to a second column within the set of parallel columns. In a particular embodiment, the virtual node represents a reconnection point for columns within the set of parallel columns.

In another embodiment of the fifth aspect, the code further includes an instruction to generate an icon corresponding to the virtual node and an instruction to transmit a display signal that includes the icon. In another particular embodiment, the code further includes an instruction to insert a next element associated with the virtual node. The row element and the next element are within a same column, and the row element is an immediately preceding element with respect to the next element. In still another embodiment, the directed graph includes a first row element that corresponds to the set of parallel columns, and a column within the set of parallel columns includes a second row element.

In a sixth aspect, a data processing system readable medium can have code to use a directed graph, wherein the code is embodied within the data processing system readable medium. The code can include an instruction to generate a row element that includes a first associated column element and a second associated column element, an instruction to generate at least one first associated element within the first column element, and an instruction to generate at least one second associated element within the second column element. The number of the first associated element(s) can be different from the number of the second associated element(s).

In one embodiment of the sixth aspect, the first associated column element includes a first action element and the second associated column element includes a second action element and a third action element. The first and second action elements lie at a same sequential position within the first and second associated column elements, respectively, and the third action element is subsequent to the second action element. The code further includes an instruction to activate the first and second action elements, an instruction to indicate the second action element is completed when or shortly after an action corresponding to the second action element is completed, and an instruction to activate the third action element after the second action element is completed, regardless of a status of the first action element. In another embodiment, the third action element is completed, regardless of the status of the first action element.

Note that not all of the activities described above in the general description or the examples are required, that a portion of a specific activity may not be required, and that one or more further activities may be performed in addition to those described. Still further, the order in which activities are listed is not necessarily the order in which they are performed.

Any one or more benefits, one or more other advantages, one or more solutions to one or more problems, or any combination thereof have been described above with regard to one or more particular embodiments. However, the benefit(s), advantage(s), solution(s) to problem(s), or any element(s) that may cause any benefit, advantage, or solution to occur or become more pronounced is not to be construed as a critical, required, or essential feature or element of any or all the claims.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer-implemented method of using a directed graph running on a browser application, the method comprising:
   accessing data that includes at least a portion of the directed graph, wherein the directed graph includes:
      a first column table for a parent column of the directed graph, the first column table including a row element for a set of parallel columns of the directed graph, each parallel column comprising a child column of the parent column;
      a row table corresponding to the row element, wherein the row table is separate from the first column table and wherein the row table comprises a set of column elements, each column element corresponding to a parallel column of the set of parallel columns; and
      a plurality of second column tables, each second column table corresponding to a column element of the set of column elements, and wherein the plurality of second column tables is separate from the row table and the first column table, wherein a first select second column includes a first action element and a second select second column table includes a second action element and a third action element, wherein the first and second action elements lie at a same sequential position within the first select second column table and the second select second column table, respectively, wherein the third action element is subsequent to the second action element, and wherein the third action element is activated before the first action element is completed; and
   receiving a user input signal at the browser application to edit the directed graph.

2. The method of claim 1, wherein the user input signal corresponds to editing the directed graph by adding an action element, a column element, or another row element.

3. The method of claim 1, further comprising:
   generating a virtual node that is associated with the row element and represents a reconnection point for the set of parallel columns.

4. The method of claim 3, further comprising receiving a user input signal corresponding to accessing the virtual node and adding a next element that lies within the parent column, wherein the row element is an immediately preceding element with respect to the next element.

5. The method of claim 1, wherein the directed graph includes a workflow.

6. A data processing system configured to perform the method of claim 1, wherein the data processing system comprises:
   a memory comprising code including instructions for carrying out the method; and
   a processor for executing the instructions.

7. The method of claim 1, wherein each second column table includes at least one selected from a group consisting of: an action element of the directed graph; and a row element corresponding to another set of parallel columns of the directed graph.

8. The method of claim 1, wherein:
   the row table comprises a first row table;
   the row element comprises a first row element;
   the set of column elements comprises a first set of column elements;
   the set of parallel columns comprises a first set of parallel columns;
   a second column table of the set of second column tables includes a second row element for a second set of parallel columns, each parallel column of the second set comprising a child column of a column of the first set; and
   the directed graph further includes:
      a second row table corresponding to the second row element, wherein the second row table is separate from the second column table and wherein the second row table comprises a second set of column elements, each column element of the second set corresponding to a column of the second set of parallel columns; and
      a plurality of third column tables, each third column table corresponding to a column element of the second set, and wherein the plurality of third column tables is separate from the second row table and the second column table.

9. A computer-implemented method of using a directed graph comprising:
   generating a row element of a column table corresponding to a parent column of the directed graph and a row table in response to receiving a first user input signal, the row element corresponding to a set of parallel columns, each parallel column comprising a child column of the parent column;
   editing the directed graph by adding a first column element within the row table and adding a first column table separate from the row table in response to receiving a second user input signal, wherein the first column element corresponds to a first parallel column of the set of parallel columns and the first column table corresponds to the first column element;
   editing the directed graph by adding a second column element within the row table and adding a second column table separate from the row table and the first column table in response to receiving a third user input signal, wherein the second column element corresponds to a second parallel column of the set of parallel columns and the second column table corresponds to the second column element; and
   executing actions in accordance with the directed graph wherein:
      the first column table includes a first action element;
      the second column table includes a second action element and a third action element, wherein the first and second action elements lie at a same sequential position within the first and second column tables, respectively, and wherein the third action element is subsequent to the second action element; and the third action element is activated before the first action element is completed.

10. The method of claim 9, wherein the third action element is completed before the first action element is completed.

11. The method of claim 9, wherein the directed graph includes a workflow.

12. A data processing system configured to perform the method of claim 9, wherein the data processing system comprises:
   a memory comprising code including instructions for carrying out the method; and
   a processor for executing the instructions.

13. A memory having code stored therein, wherein a processor is operable to execute the code, the code comprising:
   an instruction to access data that includes at least a portion of the directed graph,
   wherein
   the directed graph includes:
      a first column table for a parent column of the directed graph, the first column table including a row element for a set of parallel columns of the directed graph, each parallel column comprising a child column of the parent column;
      a row table corresponding to the row element, wherein the row table is separate from the first column table and wherein the row table comprises a set of column elements, each column element corresponding to a parallel column of the set of parallel columns; and
      a plurality of second column tables, each second column table corresponding to a column element of the set of column elements, and wherein the plurality of second column tables is separate from the row table and the first column table, wherein a first select second column table includes a first action element and a second select second column table includes a second action element and a third action element, wherein the first and second action elements lie at a same sequential position within the first select second column table and the second select second column table, respectively, wherein the third action element is subsequent to the second action element, and wherein the third action element is activated before the first action element is completed; and
   an instruction to edit the directed graph in response to receiving a user input signal at a browser application.

14. The memory of claim 13, wherein the user input signal corresponds to adding an action element, a column element, or another row element.

15. The memory of claim 13, wherein the code further comprises:
   an instruction to generate a virtual node that is associated with the row element and represents a reconnection point for the set of parallel columns.

16. The memory of claim 15, wherein the code further includes an instruction to access the virtual node and an instruction to adding a next element that lies within a same column as the row element, wherein the row element is an immediately preceding element with respect to the next element.

17. The memory of claim 13, wherein the directed graph includes a workflow.

18. The memory of claim 13, wherein each second column table includes at least one selected from a group consisting of: an action element of the directed graph;
   and a row element corresponding to another set of parallel columns of the directed graph.

19. The memory of claim 13, wherein:
   the row table comprises a first row table;
   the row element comprises a first row element;
   the set of column elements comprises a first set of column elements;
   the set of parallel columns comprises a first set of parallel columns;
   a second column table of the set of second column tables includes a second row element for a second set of parallel columns, each parallel column of the second set comprising a child column of a column of the first set; and
   the directed graph further includes:
      a second row table corresponding to the second row element, wherein the second row table is separate from the second column table and wherein the second row table comprises a second set of column elements, each column element of the second set corresponding to a column of the second set of parallel columns; and
      a plurality of third column tables, each third column table corresponding to a column element of the second set, and wherein the plurality of third column tables is separate from the second row table and the second column table.

20. A memory having code stored therein, wherein a processor is operable to execute the code, the code comprising:
   an instruction to generate a row element of a column table corresponding to a parent column of the directed graph and a row table in response to receiving the first user input signal, the row element corresponding to a set of parallel columns, each parallel column of the set comprising a child column of the parent column;
   an instruction to edit the directed graph by adding a first column element within the row table and generating a first column table separate from the row table in response to receiving a second user input signal, wherein the first column element corresponds to a first parallel column of the set of parallel columns and the first column table corresponds to the first column element and wherein the first column table includes a first action element;
   an instruction to edit the directed graph by adding a second column element within the row table and generating a second column table separate from the row table and the first column table in response to receiving a third user input signal, wherein the second column element corresponds to a second parallel column of the set of parallel columns and the second column table corresponds to the second column element and wherein the second column table includes a second action element and a third action element, wherein the first and second action elements lie at a same sequential position within the first and second column tables, respectively, and wherein the third action element is subsequent to the second action element;
   an instruction to activate the first and second action elements;
   an instruction to indicate the second action element is completed when or shortly after an action corresponding to the second action element is completed; and
   an instruction to activate the third action element after the second action element is completed, regardless of a status of the first action element.

21. The memory of claim 20, wherein the third action element is completed, regardless of the status of the first action element.

22. The memory of claim 20, wherein the directed graph includes a workflow.

* * * * *